US005657476A

United States Patent [19]

O'Connell et al.

[11] Patent Number: 5,657,476

[45] **Date of Patent: *Aug. 12, 1997**

[54] SIGNAL PROCESSOR WITH DELAY LINE MANAGEMENT LOGIC

[75] Inventors: Steve S. O'Connell, Scotts Valley; Joanne F. Ottney, Los Gatos, both of Calif.

[73] Assignee: Korg, Inc., Tokyo, Japan

[ * ] Notice: The term of this patent shall not extend beyond the expiration date of Pat. No. 5,376,572.

[21] Appl. No.: 78,726

[22] Filed: Jun. 17, 1993

Related U.S. Application Data

[63] Continuation-in-part of Ser. No. 16,865, Feb. 10, 1993, Pat. No. 5,376,752.

[51] Int. Cl.$^6$ .................................................... G06F 12/00

[52] U.S. Cl. .................... 395/493; 395/421.07; 395/436; 84/622

[58] Field of Search ............................ 365/194; 395/250, 395/400, 425, 421.07, 421.08, 436, 493; 84/622

[56] References Cited

U.S. PATENT DOCUMENTS

| | | | |
|---|---|---|---|
| 4,748,588 | 5/1988 | Norman et al. | 395/551 |
| 4,984,276 | 1/1991 | Smith | 381/63 |
| 5,058,076 | 10/1991 | Kiuchi | 365/230.01 |
| 5,327,540 | 7/1994 | Heil et al. | 395/293 |
| 5,376,752 | 12/1994 | Limberis et al. | 84/622 |

OTHER PUBLICATIONS

Wawrzynck, John et al., "MIMIC, A Custom VLSI Parallel processor For Musical Sound Synthesis", UC Berkeley, CS Div. Tech. Report No. UCB/CSD 90/578.

Wawrzynck, J and von Eicken, T., "VLSI Parallel Processing for Musical Sound synthesis", ICMC Glasgow 1990 Proceedings pp. 136–139.

Walker, "Korg Wavestation", 1990 Peter L. Alexander Publishing, Inc., pp. 9–22.

*Primary Examiner*—Eddie P. Chan

*Assistant Examiner*—Kevin L. Ellis

*Attorney, Agent, or Firm*—Wilson Sonsini Goodrich & Rosati

[57] ABSTRACT

A processing system includes delay line management logic that automatically clears the delay lines without actually filling the delay line memory with zeroes. The processing system comprises a signal processor that executes programs using delay lines. A memory, coupled to the signal processor, includes a set of memory locations to store the delay lines. Delay line management logic is responsive to a command to automatically clear for the programs being executed by the signal processor a subset of the set of memory locations allocated to a particular delay line without writing to the subset of memory locations. The delay line management logic includes a register file to store parameters for the delay lines. The parameters for particular delay lines include an offset within the set of memory locations pointing to the subset of memory locations allocated to the particular delay line, and a count indicating the number of valid memory locations in the subset. The command to clear the delay line comprises an operation to update the register file by, for instance, setting the count for the particular delay line to zero.

27 Claims, 5 Drawing Sheets

| | REGISTERS | | COUNTERS |
|---|---|---|---|
| # | DL/TBL | OFFSET | SAMPLES SINCE RESET |
| 0 | DL/T | OFFSET(0) | COUNT_LENGTH(0) |
| 1 | DL/T | OFFSET(1) | COUNT_LENGTH(1) |
| 2 | DL/T | OFFSET(2) | COUNT_LENGTH(2) |
| 3 | DL/T | OFFSET(3) | COUNT_LENGTH(3) |
| 4 | DL/T | OFFSET(4) | COUNT_LENGTH(4) |
| ••• | ••• | | |
| 58 | DL/T | OFFSET(58) | COUNT_LENGTH(58) |
| 59 | DL/T | OFFSET(59) | COUNT_LENGTH(59) |
| 60 | DL/T | OFFSET(60) | COUNT_LENGTH(60) |
| 61 | DL/T | OFFSET(61) | COUNT_LENGTH(61) |
| 62 | DL/T | OFFSET(62) | COUNT_LENGTH(62) |
| 63 | DL/T | OFFSET(63) | COUNT_LENGTH(63) |

363 362 350 360 361

SIGNAL PROCESSOR WITH DELAY LINE MANAGEMENT LOGIC

CROSS-REFERENCE TO RELATED APPLICATION

The present application is a Continuation-In-Part of U.S. patent application entitled OPEN ARCHITECTURE MUSIC SYNTHESIZER WITH DYNAMIC VOICE ALLOCATION, Ser. No. 08/016,865, filed Feb. 10, 1993, invented by Limberis, et al., now U.S. Pat. No. 5,376,752 which was owned at the time of invention and is currently owned by the same Assignee as the present application. Applicant claims the benefit of such related application under 35 U.S.C. §120, to the extent the present invention is described therein.

BACKGROUND OF THE INVENTION

1. Field of the Invention

The present invention relates to signal processors, such as audio signal processors, executing programs which include delay lines, and to structures for managing the delay lines in memory coupled to such processors.

2. Description of the Related Art

There are a number of music synthesizer architectures in common use. These include subtractive synthesis, wave table synthesis, F/M synthesis, and additive synthesis. A brief discussion of these common synthesis formats is provided in Walker, *Korg Wavestation*, Peter L. Alexander Publishing Inc., Newbury Park, Calif., 1990, pages 9 through 22. All of these four common synthesis types rely on playing back packaged waveforms, which may be manipulated in real time by the user to generate voices of the synthesizer. The packaged waveforms may consist of simple sine waves, as in the subtractive and FM synthesis formats, or on tables of actual recorded music from real instruments. The tables are typically stored in a compressed format known as Pulse Code Modulation (PCM) on memory chips in the synthesizer circuitry.

The prior art synthesizers based on playback techniques have somewhat limited range of voices that may be created by the instrument. To change the voices available on a given instrument, new sampling hardware must be added, in the form of new PCM tables, or the like.

There is a growing trend in the music synthesizer industry to synthesize sounds using sound generating programs executed by digital signal processors (DSPs). Since programming can be conducted by individual programmers who may not have access to the hardware resources necessary to update a sampling based synthesizer, users of the DSP synthesizers have much greater flexibility in the voices that may be played by their instrument.

These sound generating programs, called voice programs, are based on computational models of musical instruments, the human voice or other sound sources. Thus the developer of a sound generating program typically first defines a computational model of the sound source he or she desires to create, and then writes a computer program to execute the model. Prior art examples of such sound generating programs are described in U.S. Pat. No. 4,984,276, invented by Julius O. Smith, entitled "DIGITAL SIGNAL PROCESSING USING WAVEGUIDE NETWORKS." Delay lines are an important aspect of many sound generating programs, particularly programs which model resonant sound sources.

Dynamic voice allocation in an electronic musical instrument implies the ability to activate an arbitrary sound using whatever sound generation resources (e.g. memory, processors, bus cycles, etc.) are required, regardless of whether or not the resources are currently available. This means if resources are available, they are used immediately, and if resources are not available, they must be "stolen" from whatever voice is currently using them and reallocated to the new voice.

In typical playback based synthesizers, dynamic voice allocation is made possible by restricting the variation of the voice resource requirements to a very limited set that can be changed within a small time interval. Typically this is accomplished by making every voice use the same algorithm (which is usually built into dedicated hardware), share the same PCM data, use the same amounts of memory, and connect to the output using a fixed configuration audio bus. In this scenario, the only differences between voices are a few data values that can be initialized and changed quickly. If resources are not available, they can be made available using "voice stealing" that shuts down an active voice to allow resources allocated to it to be used by a new voice. One prior art system, known as the DPM-3, manufactured by Peavy, uses a DSP engine to execute a voice program. To dynamically change the voice, coefficients used by the single voice program are changed in real time. However, the instructions of the voice program itself cannot be changed in real time, which limits the flexibility of the system.

More recently, variable algorithm DSP systems have been added to some of these playback synthesizers that allow different audio effects processing to be applied to the signals generated by the fixed architecture voice system. However, the effects processing cannot be changed in real time because of the time it takes to make all the necessary changes, such as clearing and initializing delay line memory, in the DSP system to ready it for the new algorithm(s).

Synthesizers designed to execute voice programs utilize powerful digital signal processors to execute in real time. The real time systems have been limited in the number of voices that may be executed in real time, by the resources of the digital signal processor. All the real time voices have to be preloaded in the digital signal processor instruction space. If a voice that was not preloaded needed to be played in real time, an audible interruption of the executing program would occur so that the time consuming process of clearing delay lines, updating tables, initializing coefficients, and supplying the program itself could be carried out. Further, this process was required to displace a voice program already loaded in the instruction space of the DSP, which could cause further audible interruptions or clicks in the output of the machine.

Delay lines in such systems are set up in memory as a string of sequential locations. Thus, a delay line of length L will occupy L sequential memory locations. A circular addressing scheme is used to read the end of the delay line of length L for any particular sampling interval. When a delay line is initialized, all the memory locations in the allocated area must be cleared, so that erroneous reads are not taken to the delay line memory until valid data has been written. In order to change out a program using a delay line, the time required to clear the delay line memory can be significant, particularly for long delay lines.

Accordingly, there is a need to provide for more efficient delay line management in digital signal processing based music synthesizer systems and other real time signal processors.

SUMMARY OF THE INVENTION

The present invention provides a processing system which includes delay line management logic that automatically clears the delay lines without actually filling the delay line memory with zeroes (or the appropriate "clear data" values). Thus, the invention can be characterized as a processing system which comprises a signal processor that executes programs using delay lines. A memory, coupled to the signal processor, includes a set of memory locations to store the delay lines. Delay line management logic is coupled to the memory and the signal processor, and responsive to a command to automatically clear for the programs being executed by the signal processor a subset of the set of memory locations allocated to a particular delay line without writing to the subset of memory locations. In effect, the delay line management logic masks data in the subset of memory locations for the particular delay lines so that the signal processor reads to the particular delay line return clear data values until the particular delay line has been filled with newly written data.

According to one aspect of the invention, the delay line management logic includes a register file to store parameters for the delay lines. The parameters for particular delay lines include an offset within the set of memory locations pointing to the subset of memory locations allocated to the particular delay line, and a count indicating the number of valid memory locations in the subset. The command to clear the delay line comprises an operation to update the register file by, for instance, setting the count for the particular delay line to zero.

Reads by the signal processor to the delay lines include a delay line number which is a pointer to the appropriate parameters within the delay line register file, and a delay line length. If the count is smaller than the length for the particular read, then clear data is returned. If the count is greater than the delay line length, then the data value from the delay line is returned.

Thus, the delay line management logic may include address logic that is responsive to the pointer and the delay line length parameter of reads by the signal processor to the particular delay line to indicate when the particular delay line is filled up to a memory location indicated by the delay line length parameter with valid data. Also, output logic is coupled to the memory and responsive to the address logic to supply clear data in response to reads by the signal processor of a particular delay line until the particular delay line is filled up to the memory location indicated by the delay line length parameter with valid data. The output logic supplies data from the selected memory locations after the delay line is filled up to the memory location indicated by the delay line length parameter with valid data.

Alternatively, the present invention can be characterized as a processing system that includes a signal processor and a memory as outlined above. A register file coupled to the signal processor stores parameters for the plurality of delay lines, the parameters for a particular delay line and the plurality of delay lines include an offset parameter within the set of memory locations pointing to a subset of the set of memory locations allocated for the particular delay line and a count parameter indicating a number of valid memory locations in the subset. Delay line initialize logic is responsive to a command to mark the register file to indicate the particular delay line reset. Output logic is coupled to the memory and responsive to the delay line initialize logic and the register file to supply clear data in response to reads by the signal processor of the particular delay line if the particular delay line is marked as reset, or until the particular delay line is filled up to the memory location indicated by the delay line length parameter with valid data; and to supply data from the selected memory location in response to reads after the particular delay line is filled up to the memory location indicated by the delay line length parameter with valid data.

In one embodiment, a particular delay line is reset or "cleared" by a single operation comprising a write of all zeroes to the count parameter. Alternative systems may have an explicit control bit associated with the particular delay lines.

In a further aspect of the invention, the signal processor, the register file, the delay line initialize logic, and the output logic comprise portions of a single integrated circuit.

The present invention is particularly suited for audio processing systems, which include a source of input signals, a signal processor coupled to the source of input signals to execute real time audio programs using delay lines in response to the input signals, and a memory coupled to the signal processor and including a set of memory locations to store the delay lines. The delay line management logic is coupled to the memory and the signal processor, and responsive to a command from the source of input signals to clear for the audio programs a subset of the set of memory locations allocated to a particular delay line. The source of input signals comprises, in one aspect, a host processor used to allocate programs to the memory for execution by the signal processor and to issue the command to clear the particular delay line, when replacing one program with another.

Thus, according to a preferred aspect, each delay line is specified by a base offset and a count value in a register file. The base offset indicates the start of the particular delay line, and the count is used to gate data on delay line reads. After a delay line has been initialized by setting the count to zero, each write to that delay line increments the counter. When a read of the delay line is requested, if the delay line length requested is longer than the number of samples actually stored since the count was initialized, "zero" will be returned for the read. If the delay line length is less than the count, the actual data stored in memory will be returned. This scheme allows delay lines to be initialized without having to actually fill the memory with clear data values. In fact, a single write command by a host processor to the delay line count register accomplishes the delay line clear. This greatly improves the ability of the system to dynamically allocate programs to the signal processor.

Other aspects and advantages of the present invention can be seen upon review of the figures, the detailed description, and the claims which follow.

DESCRIPTION OF THE PREFERRED EMBODIMENTS

A detailed description of the preferred embodiment of the present invention is provided with respect to the figures.

Figure 1:
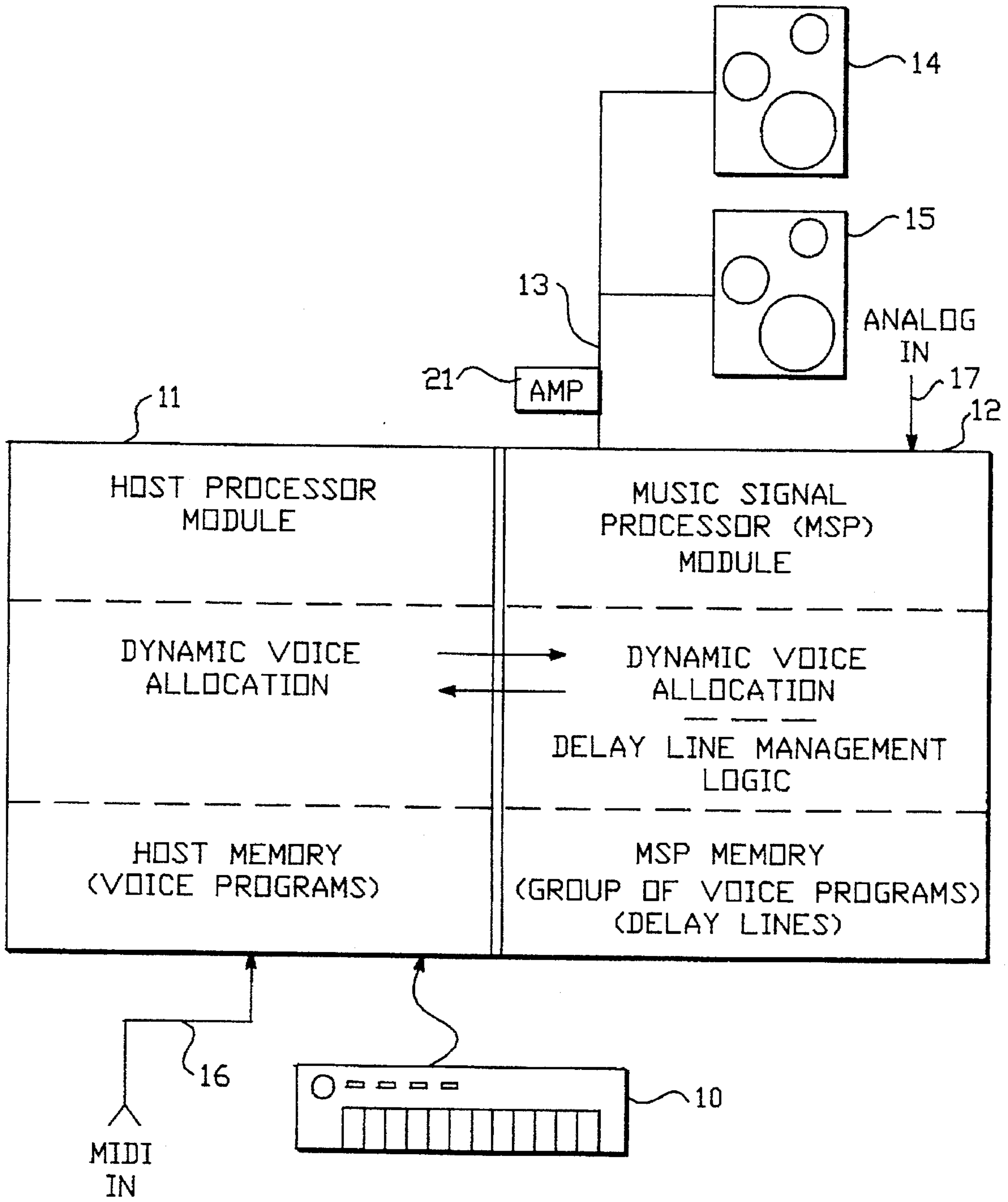
FIG. 1 is a schematic diagram of an audio signal processor including the delay line management logic of the present invention.
Figure 2:
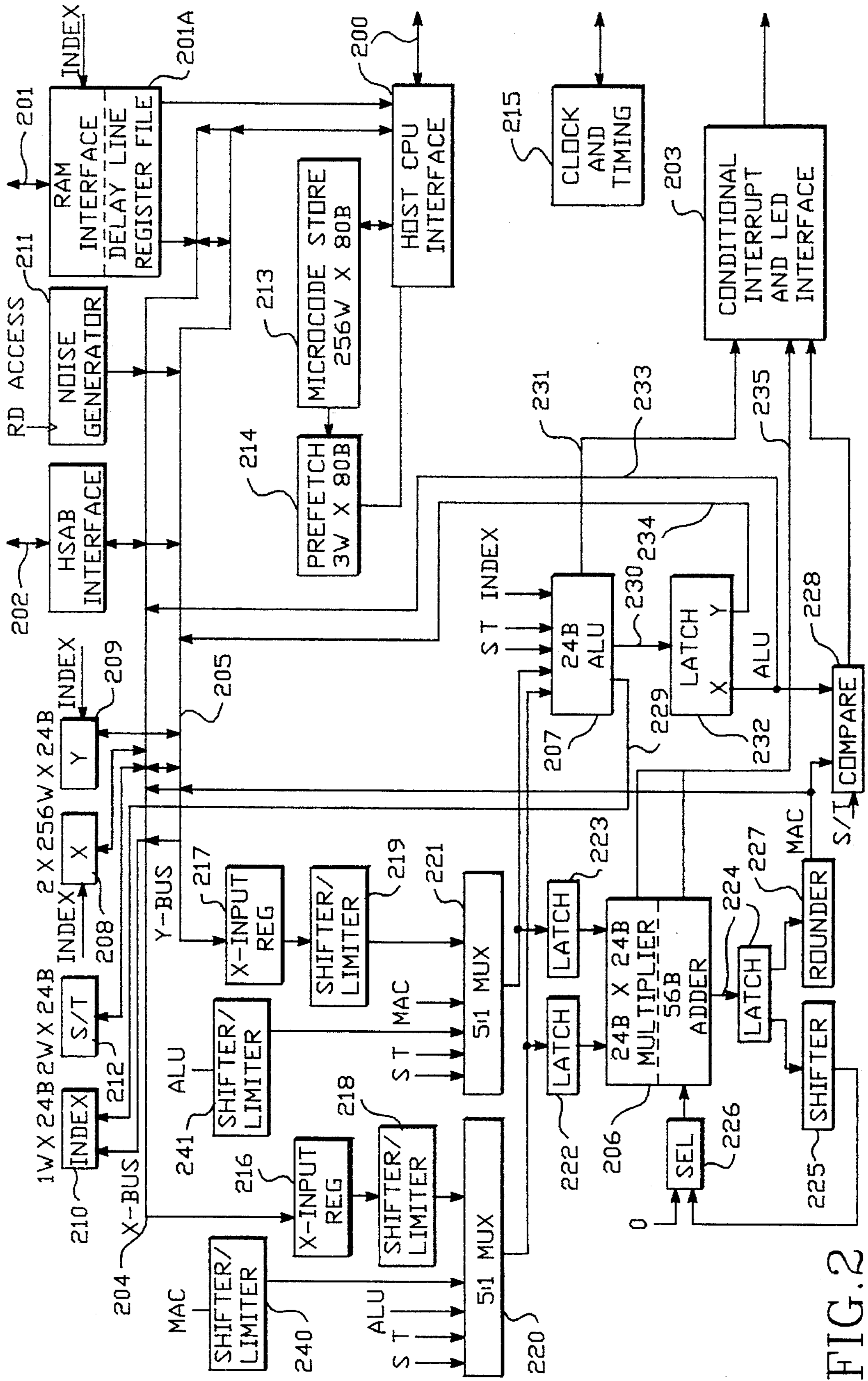
FIG. 2 is a schematic block diagram of an integrated circuit signal processor including delay line management logic according to the present invention.
Figures 3A, 3B:
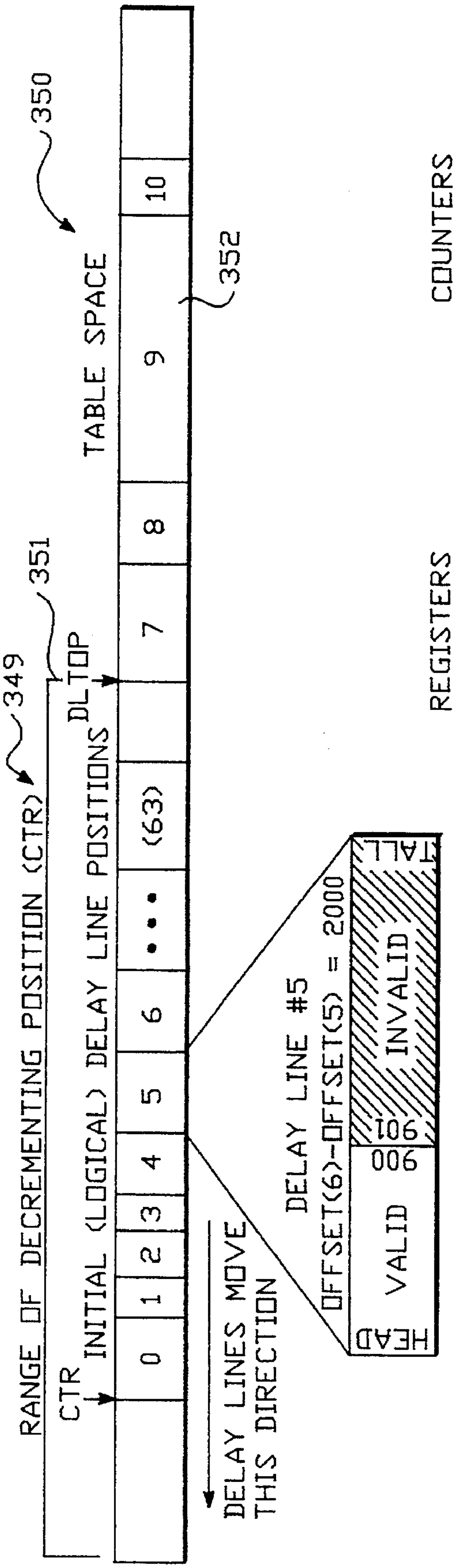
FIG. 3A illustrates the address space for a set of memory locations used for delay lines.
FIG. 3B illustrates the layout of the delay line register file according to the present invention.
Figure 4:
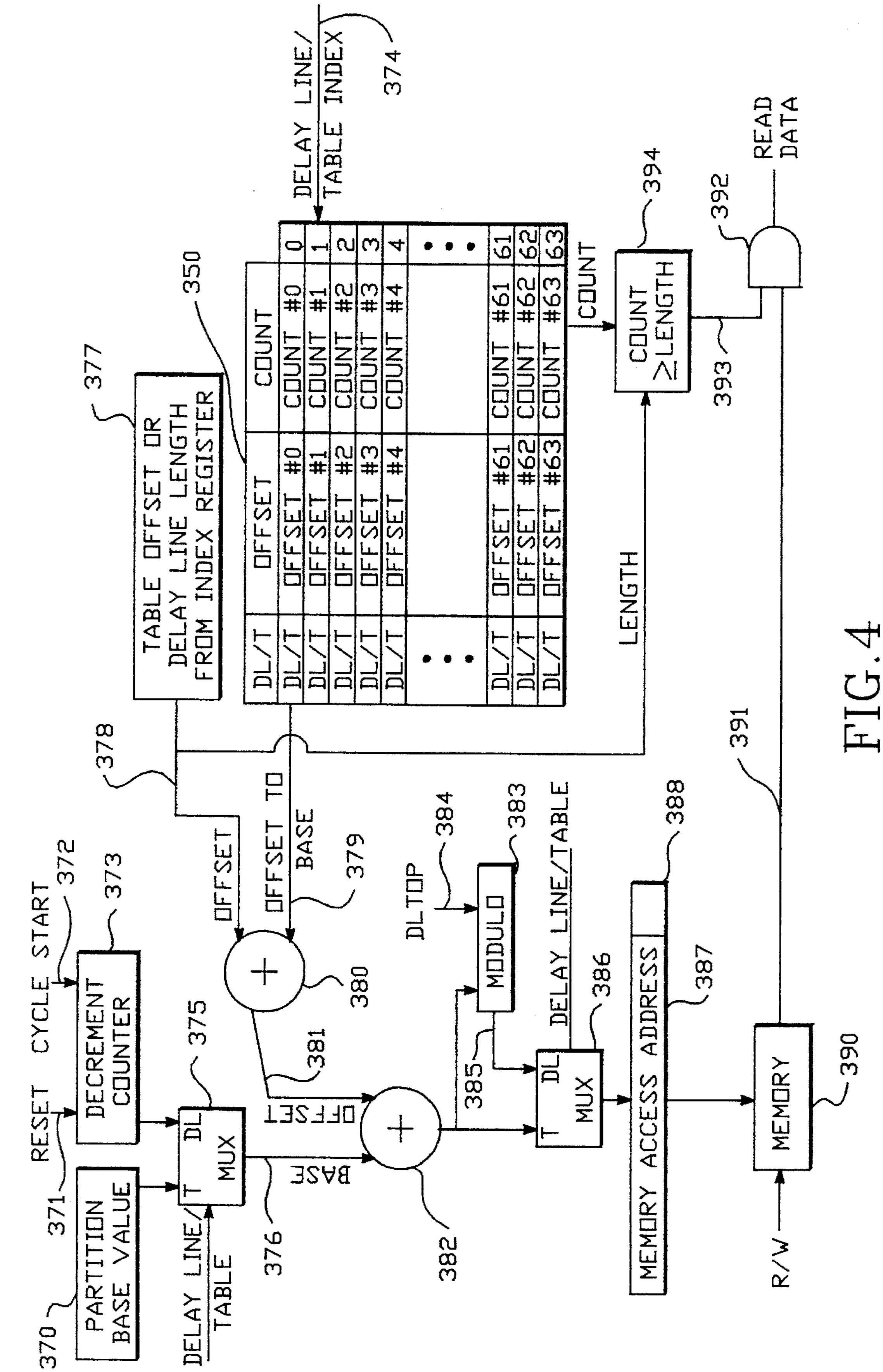
FIG. 4 illustrates the address generation logic for accessing memory locations within a particular delay line.

FIG. 1 provides an overview of a music signal processor implementing the present invention. FIGS. 2–4 illustrate an integrated circuit signal processor incorporating delay line management logic according to the present invention.

FIG. 1 provides an overview block diagram of a music synthesizer with dynamic voice allocation using delay line management logic according to the present invention. The invention may also be applied to other audio signal processors, like mixers or effects processors, and to other real time signal processors in general. The synthesizer includes an input device 10, a host processor module 11 including host memory and dynamic voice allocation resources, and a music signal processor module 12 which includes MSP memory, including delay line and dynamic voice allocation resources including delay line management logic. The music signal processor 12 generates an analog output on line 13 which is supplied through amplifier 21 to speakers 14 and 15 to generate real time sound. Besides analog sound signals, other audio signal types, such as digital sound data, in standard or non-standard formats may be used as well. The input device 10 may be a music keyboard or other device as known in the art. Other input signals may be supplied from a variety of sources, such as the MIDI standard format for musical instruments on line 16. The system also provides for accepting analog input signals on line 17 for digitizing and supply to the music signal processor module 12.

The host processor module 11 provides a plurality of voice programs stored in the host memory. Also, the host processor module 11 accepts signals from the input device 10 or from the input channel 16 and supplies such signals, or signals in response, to the music signal processor module 12 for controlling allocation and production of voices in the music signal processor module 12.

In the music signal processor module, MSP memory stores a group of voice programs and delay lines for active execution by the module. This group of voice programs utilizes the memory resources of the music signal processor 12 for instructions, delay lines, tables, coefficients and the like for active programs. The dynamic voice allocation resources in the host processor module 11 and the MSP processor module 12 provide for allocation and de-allocation of voice programs to the music signal processor module 12 in response to input signals supplied through the host from the keyboard 10 or from the MIDI input channel 16 or by host programs.

The music signal processor module 12 may have a plurality of output channels, e.g., 32, corresponding to particular voices being executed at the same time. Each channel is updated with digital signal data at an audio rate, combined with the output of other channels, and supplied to a digital to analog converter to generate analog output sound on line 13 for supply to the speakers 14 and 15.

Each channel actively utilizes a set of instructions in the instruction memory associated with the music signal processor module for supplying the output data. When a new voice is to be allocated to one of the channels, the instructions, coefficients, tables and delay lines in the music signal processor for the selected voice must be moved into the music signal processor, and any particular voice program which is being replaced by the selected voice program must be deallocated—delay lines cleared, coefficients overwritten, instructions masked and the like—without causing an audible glitch in the output signal. Each channel can be considered the result of a corresponding voice program. Thus for a 32 channel system, 32 voice programs may be allocated to the group of voice programs which are actively being executed at a given time.

To dynamically allocate a voice, a voice program must be moved from host memory in the host processor module to the MSP memory in the MSP module 12 in real time, and without significant glitch in the audio output. For the purposes of this application, real time is considered limited by the perception of the user of the input device 10. Thus, such user must strike a key to select a voice, the selected voice must be allocated to the group of voice programs in the MSP memory, and the music signal processor must execute the voice without a perceptible delay or other distortion in the audio output.

The host processor generates a command in connection with allocating a new program to the MSP module, for clearing existing delay lines for any program being replaced by the new program. The delay line management logic automatically clears the delay line, without requiring the host or the signal processor to write clear data values to all of the memory locations allocated to the particular delay line. This greatly simplifies the process of dynamic voice allocation and eliminates a large amount of overhead involved in that process.

FIG. 2 illustrates a functional block diagram of an integrated circuit music signal processor MSP. FIGS. 3 and 4 illustrate details of the delay line management logic integrated with the MSP.

The MSP as shown in FIG. 2 operates in a host programmed environment, with multiple MSPs performing multitimbral music synthesis. The MSP contains specialized interfaces, including a host interface 200, a local RAM interface 201, and a high speed audio bus HSAB interface 202.

The host interface block 200 supports access to all internal areas of the MSP chip: that is, the host can read and/or write all internal configuration, status and data registers transparent to the MSP's operation. The MSP also contains a conditional interrupt and LED interface 203 which includes at least two interrupt registers identifying which of a set of 32 possible interrupts require processing.

The RAM interface 201 supports dynamic RAM of up to 16 mega words of 24 bits and includes a delay line configuration file 201A used in allocating and controlling delay lines in the RAM. The high speed audio bus interface 202 provides 128 channels of transparent data flow among the MSPs, and allow algorithms to be spread across multiple MSPs for higher processing power.

The system includes two basic internal buses, including the X bus 204 and the Y bus 205. The primary processing resources include a 24×24 bit multiplier merged with a 56 bit accumulator (MAC 206), and an arithmetic logic unit ALU 207. The MAC 206 and ALU 207 share input latches, shifters, limiters and multiplexers which provide the inputs to the processing resources as described in more detail below.

The chip also includes two internal memory arrays referred to as the X memory 208 and the Y memory 209. Each the X memory 208 and Y memory 209 are 256 words of 24 bits each consisting of single port static RAMs. The X memory bank is a linearly indexed register array, while the Y memory bank includes segments using linear or circular addressing schemes.

The high speed audio bus interface 202 includes a register array of 64 words of 24 bits each implemented with static RAM. The host programs the mapping registers in the highspeed audio bus interface 202 to indicate which of the 128 time slots the local MSP will utilize on the high speed audio bus 202.

The system also includes an index register 210 which provides for indirect addressing into the X and Y memory spaces and into the RAM space provided the RAM interface 201. The index register 210 is used for supplying delay line length parameters for reads to delay lines.

Other components of the MSP include a noise generator 211 which is coupled to the X bus 204 and the Y bus 205, and an S/T register 212 also coupled to the X bus 204 and Y bus 205.

A microcode store 213 which is readable and writable by the host, and a prefetch buffer 214 coupled to the microcode store 213 and to the host CPU interface 200 are included. General chip clock and timing control 215 are integrated on the chip.

The data paths for MAC 206 and ALU 207 include an X input register 216 coupled to the X bus and a Y input register 217 coupled to the Y bus. The output of the X input register 216 and Y input register 217 are supplied to respective shifter/limiters 218, 219. The outputs of the shifter/limiters 218, 219 are supplied as inputs to 5 to 1 multiplexers 220 and 221 respectively. The other inputs to the 5 to 1 multiplexers include the value in the S register 212, the value in the T register 212, the output of the ALU 207, the output of the MAC 206. The MAC signal at the input of multiplexer 220 is supplied through shifter limiter 240. The ALU signal at the input of multiplexer 221 is supplied through shifter limiter 241. The outputs of the 5 to 1 multiplexers 220 and 221 are supplied into MAC input latches 222 and 223 respectively and directly as inputs into the ALU 207. The output of the MAC input latches 222 and 223 are supplied into the MAC 206. The output of the MAC 206 is supplied to latch 224. The output of latch 224 is supplied to shifter 225 which is fed back through selector 226 to the MAC 206. The lower bits of latch 224 supplied to rounder 227. The output of the rounder 227 is coupled to the X and Y buses 204, 205, and to a comparator 228. Inputs to the comparator also include the values in the S and T registers 212.

The ALU 207, in addition to receiving the output of multiplexers 220 and 221, receives the value of the S register 212, the T register 212 and the index register 210 as inputs. The ALU 207 generates an index output on line 229, and logic output on line 230, and a control output on line 231. The logic output on line 230 is supplied to latch 232, which drives the X bus on line 233 and the Y bus on line 234. The value on the X ALU output bus 233 is also supplied to the comparator 228.

The output of the comparator 228, control output on line 235 from the MAC 206, and the control output on line 231 from the ALU 207 are also supplied to the conditional interrupt and LED interface 203.

The X bus 204 and Y bus 205 carry operands among the data storage and processing blocks within the MSP. The buses are logically continuous, but there are pass transistors isolating some of the I/O functions from the main register bank, ALU, MAC buses.

Timing of the MSP and the system it operates in are derived from the sample rate of the audio outputs. The MSP is intended to operate in a system operating a 48 KHz audio output sampling rate, providing 512 microcode steps per system cycle. Each instruction cycle can include one register access on each of the X and Y buses and either a MAC or ALU operation. The ALU and MAC are separate, and can operate on independent data. They share the X and Y buses and the input multiplexers, so that only one MAC or ALU operation may be started per instruction cycle. The microcode must coordinate data movement among the register blocks, the HSAB, RAM, etc.

The microcode decode (not shown) includes a normal decode and special decode. The normal decode allows one register access on each of the X and Y buses to occur simultaneously with an ALU 207 or MAC 206 operation in one instruction cycle. The special decodes include the CONDITIONAL, INTERRUPT and LED opcodes for interface 203. When a special decode instruction is executed, register accesses may not occur during the same instruction cycle because the input select field and the address fields are used for decoding the special decode instructions.

The ALU 207 can perform one calculation per instruction cycle, and the MAC 206 can perform one calculation every two instruction cycles. Since the ALU 207 and MAC 208 both can receive inputs from themselves or each other, it is not always necessary to write the results into a register or RAM. In fact, write-back requires a separate instruction to be performed. Those instructions that result in an idle X or Y bus can be utilized by host accesses through interface 200, such as writes to the delay line configuration file 201A.

The host interface 200 allows the host processor to read and/or modify the internal registers of the MSP, and control its operation and configuration. It is the primary interface for setting the interrupt and control registers, as well as using the RAM port 201, the HSAB port, and all the internal MSP registers. The host interface 200 must contend for the X and Y buses 204, 205 with the ALU 207 and other internal blocks. For this reason, the host interface 208 inserts wait states into a CPU cycle until the desired action can be accomplished. For example, a write to the X register area 208 that begins while the ALU 207 is using that area will generate host wait states until the write by the host can be accomplished.

The CPU interface appears to the CPU as a 16-bit space of addresses, 2K words long. This entire space is not used, but the mapping allocates the full 2K. The Host interface block 200 performs all the packing and unpacking of MSP-sized words (16, 24, 56 and 80 bits) into one or more 16 bit words for the CPU to access. The data is latched internally when read or written. This allows the CPU to encounter wait states only for the first word read, or the last word written in an access. The host CPU interface also performs all of the access decoding within the MSP for access to internal registers and ports.

The MSP's RAM interface 201 provides access to a large area of memory. The MSP provides 24 bits of address range or 16 MW×24 bits. The physical RAM space is broken into eight areas by the DRAM RAS signals. The address bus is folded in half to support dynamic RAM.

The writable RAM space is allocated into two parts, in which the addressing methods are different. The first area is addressed circularly, and is used for delay lines. The second area allows standard linear and table-lookup space for samples, envelope tables, etc. These two addressing methods are depicted in FIGS. 3A and 4. The tables and delay line definitions are set with 64 dual-use configuration register set 350, shown in FIGS. 3B and 4.

FIG. 3A logically illustrates the mapping of the delay line/table memory coupled to MSP. It includes a delay line area 349 and table space 350. The delay line area 349 is limited by the range of the decrementing position counter in the RAM interface indicated as DLTOP 351. There are up to 64 logical delay line positions 0 through 63, and a number of table spaces (e.g., 352) for a total of 64 delay lines and tables.

Figure 5:
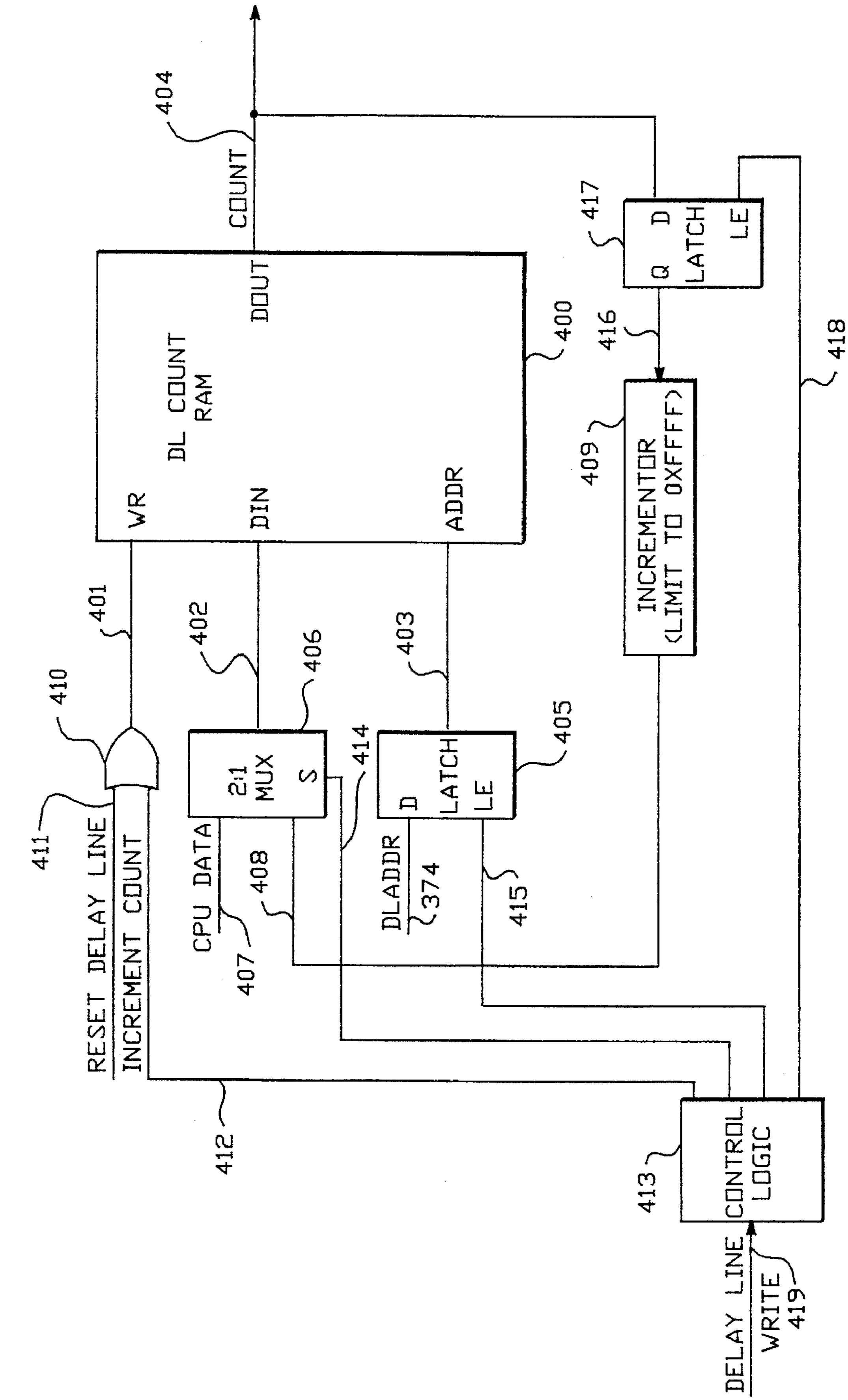
FIG. 5 illustrates a preferred implementation of counters in the register file of FIG. 3B.

FIG. 3B illustrates the delay line configuration file 201A. Each delay line/table configuration entry in this register file consists of three parts: a base offset (e.g. 360), a count (e.g. 361), and a bit DL/T (e.g. 362). indicating whether the record is a delay line or table. A particular delay line is identified by a pointer equal to the delay line number (e.g. 363). One embodiment for counters 361 is shown in FIG. 5. The base offset always indicates the start of the particular delay line or table. When the DL/T bit is set for tables, the count register of the configuration entry does nothing, and has no effect on accesses. When this bit is set for a delay line, the count is used to gate data on delay line reads. After a delay line has been initialized by setting this count to zero (normally on "key down" or other event which initializes a corresponding voice), each write to the delay line increments the count 361. When a read of the delay line is requested, if the delay line length requested is longer than the number of samples actually stored since the count was initialized, the value zero will be returned for the read. If the delay line length is less than the count, the actual data stored in memory will be returned. The count stops when it reaches $FFFF for a 32 bit register field, after which any delay line length will be accepted, and the data value at the address will be provided. This allows delay lines to be initialized without having to actually fill memory with zeroes.

The difference between the offset for slot 6 (seen in FIG. 3A) and the offset for slot 5 (seen in FIG. 3A) defines the number of samples allocated for delay line 5 (FIG. 3B). In the example, this difference may be 2000. If the delay line 5 is limited to 2000 samples long, and only 900 have been written (COUNT_LENGTH equals 900), those samples delayed beyond 900 cycles are invalid. In the case that 900 have been written since the last reset, the count length in the delay line 5 will be equal to 900. The write address for the delay line is calculated by adding the offset for the selected delay line number to the value of the decrementing position counter (Modulo DLTOP).

A read address for the delay line, if the delay line length is less than or equal to the count length in the register file 350 for the delay line, is equal to the value of the decrementing position counter plus the offset plus the delay for the sample to be read (Modulo DLTOP). A table address for a given table number and index from MSP bus is equal to the DLTOP value plus the offset for the table in the register file 350 plus the index.

The logic for generating the address is shown in FIG. 4. The inputs include a partition base value 370 from the register file, a decrement counter reset signal 371 and a cycle start signal 372 from the MSP. Also, a delay line/table index signal 374 is supplied. A decrement counter 373 receives reset signal 371 and the cycle start signal 372. The partition base value and decrement counter outputs are supplied to a multiplexer 375. The output of the multiplexer 375 provides a base address on line 376 in response to the DL/T bit in register file 350. Offset values can be provided from the table offset or delay line length from the index register 377 in the MSP 77 across line 378. Also, the offset value from the register file 350 is supplied on line 379. The values on lines 378 and 379 are added by adder 380 to supply an offset value on line 381. The base value in line 376 and offset value in line 381 are added by adder 382. The output of the adder 382 is used directly as a table address, and supplied to modulo logic 383 which receives the DLTOP reference on line 384. The output of the modulo logic 383 is supplied as the delay line address on line 385. Multiplexer 386 controlled by the DL/T bit in the register file 350 supplies the memory access address to register 387. An even/odd half word select bit 388 is supplied from the host.

The address in register 387 is supplied to the external memory 390. For writes, data is supplied to the appropriate location in memory 390 from the processor on a path not shown. For reads, data is supplied conceptually on line 391 to output logic including gate 392. A second input to gate 392 is the signal on line 393 from logic 394. Inputs to logic 394 include the count for the accessed delay line from file 350, and the delay line length from index register 377. The signal on line 393 is asserted high to allow data through gate 392 when the count is greater than or equal to the delay line length.

In a delay line, writing usually occurs at the head of the delay line, and reading usually occurs on some sample stored earlier. For writing, the address is composed of the partition base value, the offset value for that delay line, and the output of a decrement counter. The decrement counter moves all the delay lines through the circular addressing area as system cycles pass. When reading, the delay line length from the index register is added to the decrement counter and base offset for that delay line to get the desired address.

The delay line configuration file 201A of FIG. 3B provides the MSP with flexible tables and delay lines. The MSP supports any combination of delay lines and tables, up to 64 in number. There are two areas in these registers. The first defines the table/delay line base offset, and whether that entry is a table or a delay line. The second part is the count of accumulated samples for that delay line. None of these registers generates wait states for reads or writes by the host.

The first area, the delay line offset values, consists of sixty four 24 bit values. They are presented to the 16-bit host interface as two 16 bit words each. The bit number 8 of the most significant word tells the MSP RAM address calculation unit whether this entry is a delay line (1) or a table (0). When defined as a delay line, the value represents the offset from the moving head of delay line memory that is the writing point for that delay line. When defined as a table, the value represents the offset from the RAM partition value that is the start of the table. This area is sixty four 25 (24+1) bit words long, which occupies a total of 256 bytes of address space.

The second area consists of 64 16 bit registers in a 64×16 bit RAM. When the table entry is set as a delay line, this value represents the number of data values written since this register was set to zero by the CPU. This allows the MSP to emulate having had its delay lines cleared without taking the time to actually fill the RAM with data. The counter is incremented upon the delay line's write. During a delay line read, the length requested is compared to this value to determine if the stored value should be provided, or if a zero value should be returned. This 16-bit count 361 will saturate at FFFF(hex), so gated delay lines of greater than 64K are not supported. When the table entry is set as a table, the count register is unused.

The RAM interface 201 also includes a DRAM circular/linear split point register. This 24-bit register indicates to the MSP where the delay line memory ends, and the table space begins. The split point register value contains the last location in memory used for delay lines. This value must fit with the 2N−1 form, so it forms a mask of the bits allowable in the address. This register does not produce any wait states to the CPU. This register is 24-bits wide, so it is presented to the 16-bit host interface as a long word. This register is read/write.

The RAM interface 201 also includes a DRAM decrement count register. This 24-bit read-only register contains the current value of the DRAM decrement counter. This register is valid only when the MSP is halted. This register does not produce any wait states to the CPU. This register is 24-bits wide, and appears to the 16-bit host interface as a long word.

FIG. 5 is a diagram of an implementation for the counters 361 shown in FIG. 3B. In this implementation, the counters include a static RAM 400 including 64 entries addressed by the delay line/table index value 374. The RAM includes a write enable input on line 401, a data in path on line 402, an address path on line 403, and a data out path on line 404. The address in path on line 403 is supplied at the output of latch 405. The data supplied to the latch 405 is the delay line address DLADDR derived from the index on line 374. The data in path on line 402 is fed by multiplexer 406. Inputs to the multiplexer 406 include data from the CPU data paths on line 407 and data on line 408 which is generated by an incrementer 409.

The write enable signal on line 401 is supplied at the output of OR gate 410. The inputs to the OR gate include a reset delay line signal on line 411 which is asserted by the CPU when writing all zeroes to an entry to reset the delay line, or otherwise writing data into the count RAM. The second input to the OR gate 410 is an increment count signal on line 412 generated by control logic 413. The control logic 413 also generates a select signal on line 414 for controlling multiplexer 406 and a latch enable signal on line 415 for latching the delay line address from line 374.

The incrementer 409 adds one to the value supplied at its input on line 416. The value on line 416 is supplied by latch 417, which receives input data from the data out line 404. Latch 417 also receives a latch enable signal on line 418 from control logic 413.

The control logic 413 is responsive to a signal on line 419 which indicates that a delay line write access has been made by the CPU.

Delay line writes involve a read of the delay line count from the RAM 400. Thus, the control logic 413 is responsive to a write to the delay line to generate the increment count signal on line 412, to control the selector 406 across line 414 to select the output of incrementer 409 on line 408, and to assert the latch enable signals on lines 415 and 418 to latch the delay line address and the count value read from that address.

The timing of the control signals is such that the output of the incrementer 409 is supplied as input data to the delay line count RAM 400 after the count value on line 404 is read for use in accessing the particular delay line.

An alternative system may use an independent counter for each of the count registers 361 in the memory for higher speed. However, a tradeoff is involved in the amount of circuitry required for such a system.

In sum, a processing system is provided which allows a host to automatically clear a delay line without actually filling the delay line memory with zeroes. The delay line is cleared by initializing the corresponding delay line count register with a single write operation.

The signal processor, according to the preferred embodiment, provides 64 configuration register sets which define the tables and delay lines. The CPU marks the register file to indicate that a particular delay line has been reset. This operation, according to the preferred system, involves clearing the count parameter in the register file for the particular delay line, instantly clearing the delay line for the programs being executed by the music signal processor. Thus, the delay line management logic according to the present invention enhances the performance of dynamic voice allocation system based on digital signal processing.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A process system, comprising:

a signal processor to execute programs using delay lines;

a memory, coupled to the signal processor, including a set of memory locations to store the delay lines;

memory management logic, coupled to the memory and the signal processor, responsive to a command to automatically clear for the programs a subset of the set of memory locations allocated to a particularly delay line without writing to the subset of memory locations by masking data in the subset of memory locations for the particular delay line so that signal processor reads to the particular delay line return clear data values.

2. The system of claim 1, wherein the memory management logic includes a register file to store parameters allocating the set of memory locations to the delay lines and to tables of data utilized by programs, and the parameters including a first parameter indicating whether a particular subset of the set of memory locations comprises a delay line or a table, a second parameter indicating an offset within the set of memory locations pointing to the particular subset, and a count, for subsets allocated as delay lines, indicating a number of valid memory locations in the delay line.

3. The system of claim 2, wherein the register file further stores parameters for a plurality of tables, and the parameters for a particular table in the plurality of tables include an offset within the set of memory locations pointing to a subset of the set of memory locations for the particular table.

4. The system of claim 1, wherein the memory management logic includes a register file to store parameters for a plurality of delay lines, the parameters for the particular delay line in the plurality of delay lines including an offset within the set of memory locations pointing to the subset for the particular delay line and a count indicating a number of valid memory locations in the subset; and wherein the signal processor accesses data in the particular delay line with a pointer to the register file for the particular delay line and a delay line length parameter.

5. The system of claim 4, wherein the memory management logic includes:

address logic responsive to the pointer and the delay line length parameter of reads by the signal processor to the particular delay line to indicate when the particular delay line is filled up to a memory location indicated by the delay line length parameter with valid data; and output logic coupled to the memory and responsive to the address logic to supply clear data in response to reads by the signal processor of the particular delay line until the particular delay line is filled up to the memory location indicated by the delay line length parameter with valid data, and to supply data from the selected memory locations after the particular delay line is filled up to the memory location indicated by the delay line length parameter with valid data.

6. The system of claim 4, wherein the command comprises an operation to update the register file.

7. The system of claim 4, wherein the operation comprises setting the count for the particular delay line to zero.

8. A processing system, comprising:

a signal processor to execute programs using delay lines; a memory, coupled to the signal processor, including a set of memory locations to store the delay lines;

memory management logic, coupled to the memory and the signal processor, responsive to a command to automatically clear for the programs a subset of the set of memory locations allocated to a particular delay line without writing to the subset of memory locations;

wherein the memory management logic includes a register file to store parameters of the delay lines, the parameters for the particular delay line including an offset within the set of memory locations pointing to the subset for the particular delay line and a count indicating a number of valid memory locations in the subset.

9. The system of claim 8, wherein the memory management logic includes:

address logic responsive to the count and to reads by the signal processor to a selected memory location within the particular delay line to indicate when the particular delay line is filled up to the selected memory location with valid data; and output logic coupled to the memory and responsive to the address logic to supply clear data in response to reads by the signal processor of the particular delay line until the particular delay line is filled up to the selected memory location and to supply data from the selected memory locations after the particular delay line is filled up to the selected memory location.

10. The system of claim 8, wherein the command comprises an operation to update the register file.

11. The system of claim 10, wherein the operation comprises setting the count for the particular delay line to zero.

12. A processing system, comprising:

a signal processor to execute programs using delay lines;

a memory, including a set of memory locations to store the delay lines;

a register file, coupled to the signal processor, to store parameters for a plurality of delay lines, the parameters for a particular delay line in the plurality of delay lines including an offset within the set of memory locations pointing to a subset of the set of memory locations allocated for the particular delay line and a count indicating a number of valid memory locations in the subset, wherein the signal processor accesses data in the particular delay line with a pointer to the register file for the particular delay line and a delay line length parameter;

delay line initialize logic responsive to a command to mark the register file to indicate the particular delay line is reset;

output logic coupled to the memory and responsive to the delay line addressing logic to supply clear data in response to reads by the signal processor of the particular delay line if the particular delay line is marked as reset or until the particular delay line is filled up to the memory location indicated by the delay line length parameter with valid data, and to supply data from the selected memory location in response to reads after the particular delay line is filled up to the memory location indicated by the delay line length parameter with valid data.

13. The system of claim 12, wherein the delay line initialize logic marks the particular delay line as reset by an operation responsive to the command by the signal processor comprising setting the count for the particular delay line to zero.

14. The system of claim 12, wherein the signal processor, the register file, the delay line initialize logic and the output logic comprise portions of a single integrated circuit.

15. The system of claim 12, wherein the register file further stores parameters for a plurality of tables, and the parameters for a particular table in the plurality of tables include an offset within the set of memory locations pointing to a subset of the set of memory locations for the particular table.

16. An audio processing system, comprising:

a source of input signals;

a signal processor, coupled to the source of input signals, to execute real time audio programs using delay lines in response to the input signals;

a memory, coupled to the signal processor, including a set of memory locations to store the delay lines; and memory management logic, coupled to the memory and the signal processor, responsive to a command from the source of input signals to clear for the audio programs a subset of the set of memory locations allocated to a particular delay by masking data in the subset of memory locations for the particular delay line so that the signal processor reads to the particular delay line return clear data values.

17. The system of claim 16, wherein the source of input signals comprises:

a host processor to allocate programs to the memory for execution by the signal processor and to issue the command to clear the particular delay line.

18. The system of claim 16, wherein the memory management logic includes a register file to store parameters allocating the set of memory locations to the delay lines and to tables of data utilized by programs, and the parameters including a first parameter indicating whether a particular subset of the set of memory locations comprises a delay line or a table, a second parameter indicating an offset within the set of memory locations pointing to the particular subset, and a count, for subsets allocated as delay lines, indicating a number of valid memory locations in the delay line.

19. The system of claim 16, wherein the memory management logic includes a register file to store parameters for a plurality of delay lines in response to the source of input signals, the parameters for the particular delay line in the plurality of delay lines including an offset within the set of memory locations pointing to the subset for the particular delay line and a count indicating a number of valid memory locations in the subset; and wherein the signal processor accesses data in the particular delay line with a pointer to the register file for the particular delay line and a delay line length parameter.

20. The system of claim 19, wherein the memory management logic includes:

address logic responsive to the pointer and the delay line length parameter of reads by the signal processor to the particular delay line to indicate when the particular delay line is filled up to a memory location indicated by the delay line length parameter with valid data; and output logic coupled to the memory and responsive to the address logic to supply clear data in response to reads by the signal processor of the particular delay line until the particular delay line is filled up to the memory location indicated by the delay line length parameter with valid data and to supply data from the selected memory locations after the particular delay line is filled up to the memory location indicated by the delay line length parameter with valid data.

21. The system of claim 19, wherein the command comprises an operation to update the register file.

22. The system of claim 21, wherein the operation comprises setting the count for the particular delay line to zero.

23. The system of claim 19, wherein the register file further stores parameters for a plurality of tables, the pluralities for a particular table in the plurality of tables includes an offset within the set of memory locations pointing to a subset of the set of memory locations for the particular table.

24. An audio processing system, comprising:

a source of input signals;

a signal processor, coupled to the source of input signals, to execute real time audio programs using delay lines in response to the input signals;

a memory, coupled to the signal processor, including a set of memory locations to store the delay lines; and memory management logic, coupled to the memory and the signal processor, responsive to a command from the source of input signals to clear for the audio programs a subset of the set of memory locations allocated to a particular delay line;

wherein the memory management logic includes a register file to store parameters for the delay lines in response to the source of input signals, the parameters for the articular delay line including an offset within the set of memory locations pointing to the subset for particular delay line and a count indicating a number of valid memory locations in the subset.

25. The system of claim 24, wherein the memory management logic includes:

address logic responsive to the court and to reads by the signal processor to a selected memory location within the particular delay line to indicate when the particular delay line is filled up to the selected memory location with valid data; and output logic coupled to the memory and responsive to the address logic to supply clear data in response to reads by the signal processor of the particular delay line until the particular delay line is filled up to the selected memory location and to supply data from the selected memory locations after the particular delay line is filled up to the selected memory location.

26. The system of claim 24, wherein the command comprises an operation to update the register file.

27. The system of claim 26, wherein the operation comprises setting the count for the particular delay line to zero.

* * * * *